United States Patent [19]

Roetsch et al.

[11] Patent Number: 5,342,928
[45] Date of Patent: Aug. 30, 1994

[54] BENZISOTHIAZOLE- AND BENZOTHIOPHENE-AZO DYES WITH A COUPLING COMPONENT OF THE ANILINE SERIES

[75] Inventors: Thomas Roetsch, Ludwigshafen; Helmut Hagen, Frankenthal; Helmut Reichelt, Neustadt; Clemens Grund, Mannheim, all of Fed. Rep. of Germany

[73] Assignee: BASF Aktiengesellschaft, Ludwigshafen, Fed. Rep. of Germany

[21] Appl. No.: 54,230

[22] Filed: Apr. 30, 1993

[30] Foreign Application Priority Data

May 11, 1992 [DE] Fed. Rep. of Germany ........ 4215392

[51] Int. Cl.$^5$ ................... C09B 29/033; C09B 29/045; C09B 29/09; D06P 1/18
[52] U.S. Cl. ..................................... 534/788; 534/787; 8/471; 8/691; 428/195; 428/913; 428/914
[58] Field of Search ..................... 534/787, 788; 8/471, 8/691; 428/195

[56] References Cited

U.S. PATENT DOCUMENTS

| | | | |
|---|---|---|---|
| 3,876,621 | 4/1975 | Hagen et al. | 534/788 X |
| 3,919,188 | 11/1975 | Hagen et al. | 534/788 |
| 4,119,621 | 10/1978 | Hansen et al. | 534/788 X |
| 4,431,585 | 2/1984 | Tappe et al. | 534/788 X |
| 4,465,628 | 8/1984 | Grund et al. | 534/788 |
| 5,079,365 | 1/1992 | Sens et al. | 546/119 |

FOREIGN PATENT DOCUMENTS

| | | |
|---|---|---|
| 0390024 | 10/1990 | European Pat. Off. . |
| 0400451 | 12/1990 | European Pat. Off. . |
| 0416434 | 3/1991 | European Pat. Off. . |
| 2301571 | 9/1976 | France . |
| 2441644 | 6/1980 | France . |
| WO93/04057 | 3/1993 | World Int. Prop. O. . |

OTHER PUBLICATIONS

Algerino et al., *Chemical Abstracts*, vol. 55, 22827a–22828c (1961).
Journal of Medicinal Chemistry, vol. 6, No. 1, Mar. 1963, pp. 217–219, E. F. Elslager, et al., "{4–(Aminoalkylamino)–1–Naphthylazo} Heterocyclic Compounds, A Novel Class of Schistosomicides".
Egyptian Journal of Chemistry, vol. 16, No. 1, 1973, pp. 49–68, M. Kamel, et al., "Studies of Some New Monoazo Dyes Containing the Benzo(B)Thiophene Nucleus".

*Primary Examiner*—Patricia L. Morris
*Assistant Examiner*—Fiona T. Powers
*Attorney, Agent, or Firm*—Oblon, Spivak, McClelland, Maier & Neustadt

[57] ABSTRACT

Azo dyes useful for dyeing or printing textile fibers or fabrics and containing novel aminobenzo heterocycles as diazo component have the formula

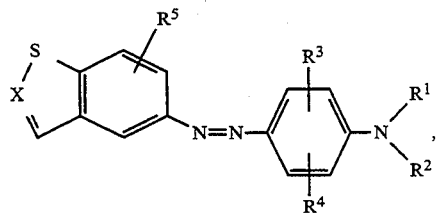

where
X is nitrogen or a radical of the formula $CR^6$, where $R^6$ is hydrogen, $C_1$–$C_4$-alkoxycarbonyl or $C_1$–$C_6$-alkanoyl,
$R^1$ and $R^2$ are substituted or unsubstituted $C_1$–$C_{10}$-alkyl or substituted or unsubstituted $C_3$–$C_4$-alkenyl or additionally in the case of $R^1$ hydrogen,
$R^3$ is hydrogen or $C_1$–$C_4$-alkoxy,
$R^4$ is $C_1$–$C_6$-alkyl, $C_1$–$C_4$-alkoxy, substituted or unsubstituted $C_1$–$C_8$-alkanoylamino, $C_1$–$C_4$-alkylsulfonylamino, $C_3$–$C_4$-alkenoylamino or substituted or unsubstituted $C_1$–$C_4$-alkoxycarbonylamino, and
$R^5$ is hydrogen, nitro, halogen, $C_1$–$C_4$-alkoxy, $C_1$–$C_4$-alkylthio or cyano.

11 Claims, No Drawings

BENZISOTHIAZOLE- AND BENZOTHIOPHENE-AZO DYES WITH A COUPLING COMPONENT OF THE ANILINE SERIES

The present invention relates to novel azo dyes of the formula I

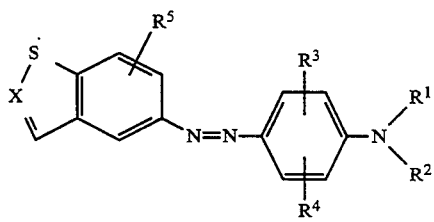

where
- X is nitrogen or a radical of the formula $CR^6$, where $R^6$ is hydrogen, $C_1$–$C_4$-alkoxycarbonyl or $C_1$–$C_6$-alkanoyl,
- $R^1$ and $R^2$ are identical or different and each is independently of the other $C_1$–$C_{10}$-alkyl, which may be interrupted by 1 or 2 oxygen atoms in ether function and may be phenyl-, cyano-, $C_1$–$C_4$-alkoxycarbonyl-, $C_1$–$C_4$-alkoxycarbonyloxy-, hydroxyl- or $C_1$–$C_4$-alkanoyloxy-substituted, or unsubstituted or chlorine-substituted $C_3$–$C_4$-alkenyl, or additionally in the case of $R^1$ hydrogen,
- $R^3$ is hydrogen or $C_1$–$C_4$-alkoxy,
- $R^4$ is $C_1$–$C_6$-alkyl, $C_1$–$C_4$-alkoxy, unsubstituted or halogen-, cyano-, hydroxyl-, $C_1$–$C_4$-alkoxy-, phenoxy- or $C_1$–$C_4$-alkanoyloxy-substituted $C_1$–$C_6$-alkanoylamino, $C_1$–$C_4$-alkylsulfonylamino, $C_3$–$C_4$-alkenoylamino or unsubstituted or $C_1$–$C_4$-alkoxy-substituted $C_1$–$C_4$-alkoxycarbonylamino, and
- $R^5$ is hydrogen, nitro, halogen, $C_1$–$C_4$-alkoxy, $C_1$–$C_4$-alkylthio or cyano, the use thereof for dyeing or printing textile fibers or fabrics and to the use of aminobenzo heterocycles as diazo component.

EP-A-390 024 and EP-A-400 451 disclose azo dyes having a diazo component of the aminobenzisothiazole series and a coupling component of the pyrazole or pyridone series or of the isothiazole or diaminopyridone series.

It is an object of the present invention to provide novel azo dyes which have a coupling component of the aniline series. The diazo component shall be of the aminobenzisothiazole or aminobenzothiophene series. The novel azo dyes shall have advantageous application properties.

We have found that this object is achieved by the azo dyes of the formula I defined at the beginning.

Any alkyl or alkenyl appearing in the above-mentioned formulae can be straight-chain or branched.

Substituted alkyl is in general monosubstituted or disubstituted.

$R^1$, $R^2$ and $R^4$ are each for example methyl, ethyl, propyl, isopropyl, butyl, isobutyl, sec-butyl, pentyl, isopentyl, neopentyl, tert-pentyl, hexyl or 2-methylpentyl.

$R^5$ is for example methylthio, ethylthio, propylthio, isopropylthio, butylthio, isobutylthio, fluorine, chlorine or bromine.

$R^4$ and $R^5$ may each also be, as is $R^3$, for example methoxy, ethoxy, propoxy, isopropoxy, butoxy, isobutoxy or sec-butoxy.

$R^6$ is for example methoxycarbonyl, ethoxycarbonyl, propoxycarbonyl, isopropoxycarbonyl, butoxycarbonyl, isobutoxycarbonyl, sec-butoxycarbonyl, formyl, acetyl, propionyl, butyryl, pentanoyl or hexanoyl.

$R^1$ and $R^2$ may each also be for example heptyl, octyl, 2-ethylhexyl, isooctyl, nonyl, isononyl, decyl, benzyl, 1- or 2-phenylethyl, cyanomethyl, 2-cyanoethyl, 3-cyanopropyl, 2-cyanobutyl, 4-cyanobutyl, 5-cyanopentyl, 6-cyanohexyl, 2-hydroxyethyl, 2-hydroxypropyl, 3-hydroxypropyl, 2-hydroxybutyl, 4-hydroxybutyl, 5-hydroxypentyl, 6-hydroxyhexyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, 5-methoxycarbonylpentyl, 5-ethoxycarbonylpentyl, 6-methoxycarbonylhexyl, 6-ethoxycarbonylhexyl, 2-methoxycarbonyloxyethyl, 2-ethoxycarbonyloxyethyl, 2- or 3-methoxycarbonyloxypropyl, 2- or 3-ethoxycarbonyloxypropyl, 2-acetyloxyethyl, 2-propionyloxyethyl, 2- or 3-acetyloxypropyl, 2- or 3-propionyloxypropyl, 2- or 4-acetyloxybutyl, 2- or 4-propionyloxybutyl, prop-2-en-1-yl, but-2-en-1-yl, 2-methylprop-2-en-1-yl, 3-chloroprop-2-en-1-yl or 4-chlorobut-2-en-1-yl.

$R^4$ may also be for example acetylamino, propionylamino, butyrylamino, isobutyrylamino, 2-ethylhexanoylamino, methoxyacetylamino, ethoxyacetylamino, phenoxyacetylamino, 2- or 3-methoxypropionylamino, chloroacetylamino, cyanoacetylamino, hydroxyacetylamino, acetyloxyacetylamino, methylsulfonylamino, ethylsulfonylamino, propylsulfonylamino, isopropylsulfonylamino, butylsulfonylamino, acroylamino, methacroylamino, methoxycarbonylamino, ethoxycarbonylamino, propoxycarbonylamino, isopropoxycarbonylamino, butoxycarbonylamino, 2-methoxyethoxycarbonylamino or 2-ethoxyethoxycarbonylamino.

Preference is given to azo dyes of the formula Ia

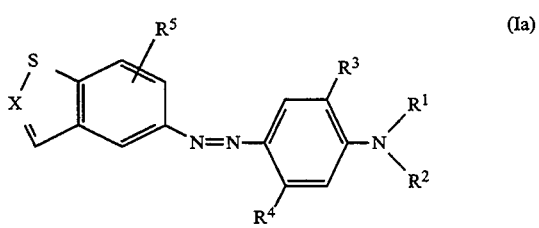

where X, $R^1$, $R^2$, $R^3$, $R^4$ and $R^5$ are each as defined above.

Particular preference is given to azo dyes of the formula Ib

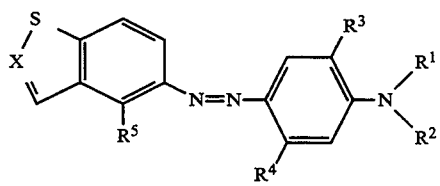

where X, $R^1$, $R^2$, $R^3$, $R^4$ and $R^5$ are each as defined above.

Importance is attached to azo dyes of the formula I where X is nitrogen.

Importance is also attached to azo dyes of the formula I where $R^5$ is cyano.

Importance is also attached to azo dyes of the formula I where $R^3$ is hydrogen.

Importance is also attached to azo dyes of the formula I where $R^1$ and $R^2$ are each independently of the other $C_1$–$C_6$-alkyl, which may be interrupted by 1 oxygen atom in ether function and may be phenyl-, cyano-, $C_1$–$C_4$-alkoxycarbonyl- or hydroxyl-substituted, or unsubstituted or chlorine-substituted $C_3$–$C_4$-alkenyl.

Importance is further attached to azo dyes of the formula I where $R^4$ is $C_2$–$C_4$-alkanoylamino, which may be substituted by $C_1$–$C_4$-alkoxy or by phenoxy, or $C_1$–$C_4$-alkylsulfonylamino.

The present invention also provides a method of using aminobenzo heterocycles of the formula II

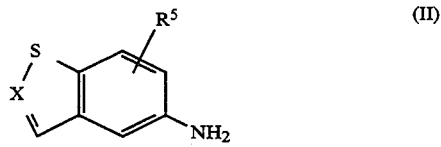

where X and $R^5$ are each as defined above, as diazo component in the preparation of azo dyes.

The novel azo dyes of the formula I can be obtained in a conventional manner. For example, an aminobenzisothiazole or aminobenzothiophene of the formula II is diazotized and coupled with an aniline derivative of the formula III

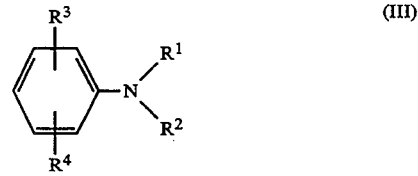

where $R^1$, $R^2$, $R^3$ and $R^4$ are each as defined above.

The anilines of the formula III are in general compounds known per se. Diazo components of the aminobenzisothiazole or aminobenzothiophene series are described for example in earlier Patent Application PCT/EP/92/01798 or can be obtained by the methods mentioned therein.

The azo dyes of the formula I according to the invention are advantageously suitable for use as disperse dyes for dyeing or printing textile fibers or fabrics, in particular polyesters but also fibers or fabrics composed of cellulose esters or polyamides or blends of polyester and cellulose fibers.

To obtain a favorable color build-up it can be of advantage in some cases to dye with mixtures of the dyes of the formula I with one another.

The novel azo dyes are notable for high color strength, good fastness properties and brilliant hues.

The azodyes of the invention are also advantageous for thermal transfer from a transfer sheet to a plastics coated paper by means of an energy source (see for example EP-A-416 434).

Embodiments of the invention will now be more particularly described by way of example.

EXAMPLE 1 a) 4.40 g (0.025 mol) of 5-amino-4-cyanobenzisothiazole were dissolved in 60 ml of 3:1 v/v glacial acetic acid/propionic acid and 10 ml of 85% strength by weight sulfuric acid, admixed at from $-5°$ to $0°$ C. with 13 g of nitrosylsulfuric acid (about 42% of $N_2O_3$) and stirred at from $-5°$ to $0°$ C. for 3 hours.

b) 7.10 g ( 0. 027 tool ) of 3-diethylaminoacetanilide were dissolved in 150 ml of water and 2.5 ml of 96% strength by weight sulfuric acid, introduced as an initial charge together with 0.50 g of amidosulfuric acid and about 500 g of ice, and admixed at from $-5°$ to $0°$ C. with the diazonium salt solution described under a). After the coupling had ended, the dye was filtered off with suction at $60°$ C., washed neutral and dried, leaving 8.40 g (86% of theory) of the dye of the formula

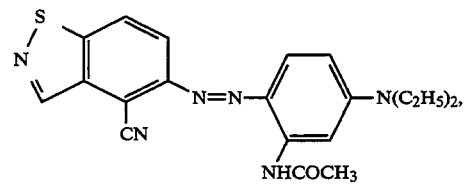

which dyes polyester in a red shade.

The same method produces the dyes of the formula

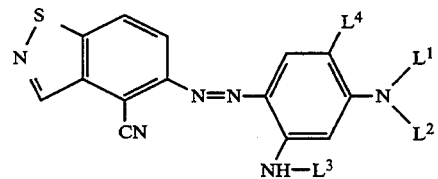

listed in the following table:

TABLE

| Ex. No. | $L^1$ | $L^2$ | $L^3$ | $L^4$ | Hue on polyester |
|---|---|---|---|---|---|
| 2 | $C_2H_5$ | $C_2H_5$ | $COCH_2OCH_3$ | H | yellowish red |
| 3 | $C_2H_4OCOCH_3$ | $C_2H_4OCOCH_3$ | $COCH_3$ | H | yellowish red |
| 4 | $C_2H_4OCH_3$ | $C_2H_4OCH_3$ | $COCH_2OC_6H_5$ | H | yellowish red |
| 5 | $C_2H_5$ | $C_2H_5$ | $COOC_2H_4OC_2H_5$ | H | yellowish red |
| 6 | $C_2H_5$ | $C_2H_5$ | $SO_2CH_3$ | H | yellowish red |

TABLE-continued

| Ex. No. | $L^1$ | $L^2$ | $L^3$ | $L^4$ | Hue on polyester |
| --- | --- | --- | --- | --- | --- |
| 7 | $C_2H_4OCH_3$ | $C_2H_4OCH_3$ | $SO_2CH_3$ | H | yellowish red |
| 8 | $C_2H_5$ | $C_2H_5$ | $SO_2C_3H_7$ | H | yellowish red |
| 9 | $CH_2CH=CH_2$ | $CH_2CH=CH_2$ | $COCH_3$ | H | yellowish red |
| 10 | $CH_2CH=CHCl$ | $CH_2CH=CHCl$ | $COCH_3$ | H | red |
| 11 | $C_2H_4OC_2H_5$ | $C_2H_4OC_2H_5$ | $OCH_3$ | $OC_2H_5$ | violet |
| 12 | $C_2H_4OC_2H_5$ | $C_2H_4OC_2H_5$ | $COCH_3$ | $OCH_3$ | violet |

We claim:

1. An azo dye of the formula I:

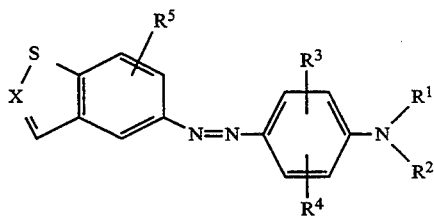

(I)

wherein

X is nitrogen or a radical of the formula $CR^6$, where $R^6$ is $C_1$–$C_4$-alkoxycarbonyl or $C_1$–$C_6$-alkanoyl, $R^1$ and $R^2$ are identical or different and each is independently of the other $C_1$–$C_{10}$-alkyl or $C_1$–$C_{10}$-alkyl ether having one or two oxygen atoms, unsubstituted or phenyl-, cyano-, hydroxyl-, $C_1$–$C_4$-alkoxycarbonyl-, $C_1$–$C_4$-alkoxycarbonyloxy- or $C_1$–$C_4$-alkanoyloxy-substituted, or unsubstituted or chlorine-substituted $C_3$–$C_4$-alkenyl, or additionally in the case of $R^1$ hydrogen, $R^3$ is hydrogen or $C_1$–$C_1$-alkoxy, $R^4$ is $C_1$–$C_6$-alkyl or $C_1$–$C_4$-alkoxy, unsubstituted or halogen-,cyano-, hydroxyl-, $C_1$–$C_4$-alkoxy-, phenoxy or $C_1$–$C_4$-alkanoyloxy-substituted, $C_1$–$C_8$-alkanoylamino, $C_1$–$C_4$-alkyl sulfonyl amino, $C_3$–$C_4$-alkenoylamino or unsubstituted or alkoxy-substituted $C_1$–$C_4$-alkoxycarbonylamino, and $R^5$ is cyano.

2. The azo dye of claim 1, having the formula Ia:

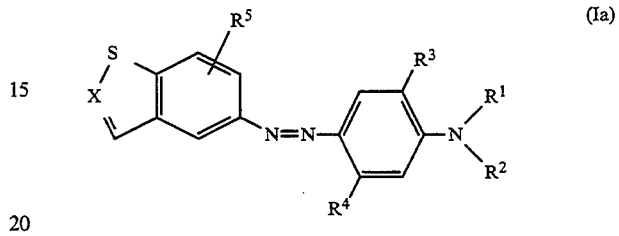

(Ia)

3. The azo dye of claim 1, having the formula Ib:

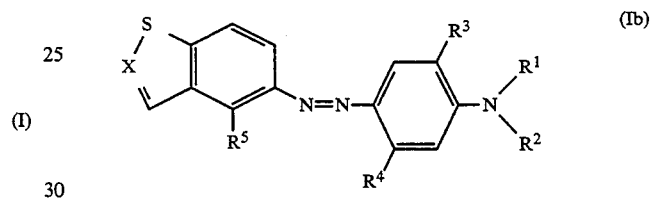

(Ib)

4. The azo dye of claim 1, wherein X is nitrogen.

5. The azo dye of claim 1, wherein $R^3$ is hydrogen.

6. The azo dye of claim 1, wherein $R^1$ and $R^2$ are each independently of the other $C_1$–$C_6$-alkyl or $C_1$–$C_6$-alkyl ether having one oxygen atom, unsubstituted or phenyl-, cyano-, $C_1$–$C_4$-alkoxycarbonyl-substituted or unsubstituted or chlorine-substituted $C_3$–$C_4$-alkenyl.

7. The azo dye of claim 1, wherein $R^4$ is $C_2$–$C_4$-alkanoylamino, unsubstituted or $C_1$–$C_4$-alkoxy- or phenoxy-substituted, or $C_1$–$C_4$-alkyl-sulfonylamino.

8. A method of treating a textile fiber, textile fabric or plastic-coated paper, comprising, contacting at least one azo dye of claim 1 with said textile fiber, textile fabric or plastic-coated paper.

9. The method of claim 8, comprising contacting a textile fiber or textile fabric and further comprising dyeing said textile fiber or textile fabric.

10. The method of claim 8, comprising contacting a textile fiber or textile fabric and further comprising printing said textile fiber or textile fabric.

11. The method of claim 8, comprising contacting said plastic-coated paper and further comprising transferring said azo dye from a transfer sheet to said plastic-coated paper.

* * * * *